US007904029B2

(12) United States Patent
Brady et al.

(10) Patent No.: US 7,904,029 B2
(45) Date of Patent: *Mar. 8, 2011

(54) METHOD AND APPARATUS FOR HIGH FREQUENCY WIRELESS COMMUNICATION

(75) Inventors: Vernon T. Brady, Orlando, FL (US); Greg Stilwell, Orlando, FL (US); Eugene Fischer, Clermont, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1021 days.

This patent is subject to a terminal disclaimer.

(21) Appl. No.: 09/975,995

(22) Filed: Oct. 15, 2001

(65) Prior Publication Data

US 2002/0025786 A1 Feb. 28, 2002

Related U.S. Application Data

(63) Continuation of application No. 09/185,579, filed on Nov. 4, 1998, now Pat. No. 6,442,374.

(51) Int. Cl.
*H04B 1/44* (2006.01)

(52) U.S. Cl. ...................... 455/78; 455/127.3; 455/343.1

(58) Field of Classification Search .................... 455/82, 455/83, 77, 78, 84, 86, 88, 550.1, 129, 101, 455/73, 127.1, 127.2, 127.3, 90.1–90.3, 575.8
See application file for complete search history.

(56) References Cited

U.S. PATENT DOCUMENTS

| | | | | |
|---|---|---|---|---|
| 4,985,707 | A | 1/1991 | Schmidt et al. | |
| 5,574,967 | A * | 11/1996 | Dent et al. | 455/12.1 |
| 5,619,503 | A | 4/1997 | Dent | |
| 5,659,322 | A * | 8/1997 | Caille | 342/188 |
| 5,724,666 | A * | 3/1998 | Dent | 455/562.1 |
| 5,745,009 | A * | 4/1998 | Leroux et al. | 330/277 |
| 5,793,253 | A * | 8/1998 | Kumar et al. | 330/124 R |
| 5,911,117 | A * | 6/1999 | Bhame et al. | 455/575.1 |
| 5,915,213 | A * | 6/1999 | Iwatsuki et al. | 455/116 |
| 6,157,811 | A * | 12/2000 | Dent | 455/12.1 |
| 6,229,992 | B1 * | 5/2001 | McGeehan et al. | 455/78 |
| 6,442,374 | B1 * | 8/2002 | Brady et al. | 455/73 |
| 6,445,926 | B1 * | 9/2002 | Boch et al. | 455/447 |

* cited by examiner

*Primary Examiner* — Walter F Briney, III

(74) *Attorney, Agent, or Firm* — Buchanan Ingersoll & Rooney PC

(57) ABSTRACT

A full duplex communication system is capable of providing actual wireless transmission rates on the order of 125 Mb/s, or higher, with relatively high transmission power on the order of 0.5 to 2 watts (W) or higher, with a high signal-to-noise (S/N) ratio, a bit error rate on the order of $10^{-12}$ or lower, 99.99% availability, and with relatively simple circuit designs. A single compact and efficient, low distortion transceiver design is used based on high power (e.g., 0.5 W) monolithic millimeter wave integrated circuits (MMICs), having a compression point which accommodates high speed modems such as OC-3 and 100 Mb/s Fast Ethernet modems used in broadband networking technologies like SONET/SDH (e.g., SONET ring architectures having self-healing ring capability). By applying high power MMIC technology of conventional radar systems to wireless duplex communications, significant advantages can be realized in a fixed wireless spectrum of 18-40 GHz or wider.

42 Claims, 6 Drawing Sheets

RF INPUT
LO INPUT
MLIN+K CONN. I.L.
AMP
X2
BPF
R
I
L
90 DEG HYBRID
RF OUT
-3dBm
10dBm
9dBm
18.5dBm
13.5dBm
-4dBm
11dBm
-11dBm
-16dBm
-7dBm
-13dBm
8.8dBm
25.1dBm
21.8dBm
28.8 dBm
31.5dBm
34.2dBm
33.2dBm
-1dB
+12dB
-5dB
-2.5dB
-7dB
+9dB
+22dB
-.3dB
+20dB
+7dB
100
102
104
106
108
110
112
114
116
118
120
122
124
126
128
130
132
134
136
138
140
142
144
146
148
150
152
154
156
158
160
162
164
166
168
170
172
174
176

METHOD AND APPARATUS FOR HIGH FREQUENCY WIRELESS COMMUNICATION

This application is a continuation Ser. No. 09/185,579, filed on Nov. 4, 1998 U.S. Pat. No. 6,442,374.

BACKGROUND OF THE INVENTION

1. Field of the Invention

The present invention relates generally to communication systems and methods, and more particularly to wireless transceivers for use in connection with high frequency, short wavelength systems.

2. State of the Art

Communication systems which employ wireless transceivers are well known. However, as is the case with most electronic technologies today, there is an ever increasing demand to improve information transmission rates and range (that is, power output), while at the same time, reducing the influence of noise and improving the quality of transmission. In addition, there is always increasing demand to broaden the applicability of wireless communications to technologies still dependent on wired or fiber linked communication, such as mainframe-to-mainframe communications where high data rate and high power requirements have precluded the use of conventional wireless communications. To satisfy these competing concerns, a compromise is often reached whereby some sacrifice in transmission rate is accepted to enhance the integrity of the data transmitted. In addition, some sacrifice in transmission range is accepted to reduce the transceiver's circuit complexity and cost.

Accordingly, it would be desirable to provide systems and methods for communication which use a wireless transceiver, wherein the necessity to balance the foregoing system characteristics is avoided and wherein applicability is not limited by the data rate and/or power output requirements of the transceiver. More particularly, it would be desirable to provide a full duplex, wireless transceiver capable of providing high transmission rates (having, for example, transmit operating frequencies in an 18-40 gigahertz (GHz) spectrum range or wider and actual transmission rates on the order of 100 to 125 megabits per second (125 Mb/s), or higher), with high transmission power, high signal-to-noise ratios and reduced circuit complexity.

SUMMARY OF THE INVENTION

The present invention is directed to providing a full duplex communication system capable of providing actual wireless transmission rates on the order of 125 Mb/s, or higher, with relatively high transmission power on the order of 0.5 to 2 watts (W) or higher, with a high signal-to-noise (S/N) ratio, a bit error rate on the order of $10^{-12}$ or lower, 99.99% availability, and with relatively simple circuit designs. Exemplary embodiments can provide these features using a single compact and efficient, low distortion transceiver design based on high power (e.g., 0.5 W) monolithic millimeter wave integrated circuits (MMICs), having a compression point which accommodates high speed modems such as OC-3 and 100 Mb/s Fast Ethernet modems used in broadband networking technologies like SONET/SDH (e.g., SONET ring architectures having self-healing ring capability). By applying high power MMIC technology of conventional radar systems to wireless duplex communications, significant advantages can be realized. Exemplary embodiments have transmit operating frequencies in a fixed wireless spectrum of 18-40 GHz or wider, and produce a power output on the order of 0.5 W to 2 W or more, with a relatively simple circuit design. Exemplary embodiments also use a dual polarization antenna feature to provide transmission/reception isolation. The antenna can be configured as an integrated flat plane antenna. In addition, exemplary embodiments achieve a design compactness with an exciter design that can be employed for both the transmitter and receiver. As such, the present invention has wide application including, for example, point-to-point wireless communications between computers, such as between personal computers, between computer networks and between mainframe computers, over broadband networks with high reliability. Exemplary embodiments are further directed to a transceiver wherein components used for at least one of modulation and demodulation of information are mounted directly to a housing, materials used for the various components and for the housing having coefficients of thermal expansion which are matched.

Generally speaking, exemplary embodiments of the present invention are directed to an apparatus for wireless communication of information comprising:

at least one of a signal modulator for producing information signals and a signal demodulator for receiving said information signals, configured using at least one monolithic millimeter wave integrated circuit; and an antenna for at least one of wireless transmission and wireless reception of said information signals.

In an alternate embodiments, an apparatus and associated method are provided for wireless communication (transmission or reception) of information, comprising: means for performing at least one of modulating and demodulating information signals; and means for information transmission/reception, said information transmission/reception means providing for information transmission using a first polarization and for information reception using a second polarization to thereby isolate information transmission from information reception.

In yet alternate embodiments of the present invention, a transceiver is provided which comprises: at least one of a modulator for modulating information and a demodulator for demodulating information; and a housing within which said at least one of modulator and demodulator is mounted, components used for at least one of modulation and demodulation of said information being mounted directly to said housing.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
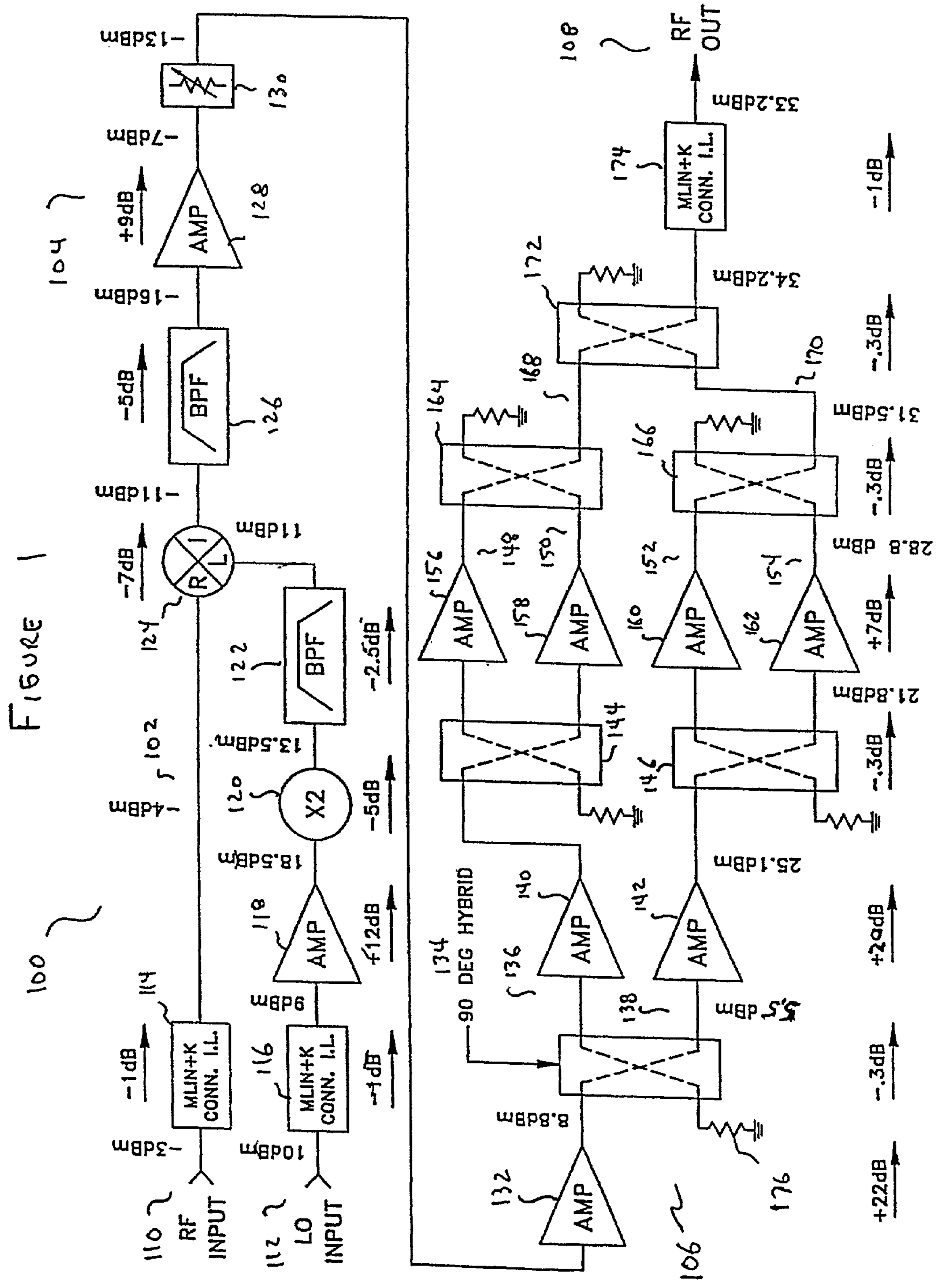
FIG. 1 shows an exemplary embodiment of a transmitter block diagram for use in a transceiver.

FIG. 1 shows an exemplary block diagram of a transmitter 100 configured to transmit information, such as data, at actual information rates on the order of 100 to 125 Mb/s, or lower or higher. Those skilled in the art will appreciate that this actual transmission rate must account for overhead, such as conventional error correction, clock synchronization signals, and so forth. As such, the rate with which the data is transmitted will be somewhat lower (for example, 100 Mb/s). Although FIG. 1 illustrates a transmitter, those skilled in the art will appreciate that the transmitter can be configured as part of a transceiver which includes both a transmitter (such as that of FIG. 1) and a receiver.

The exemplary FIG. 1 embodiment is configured to produce a power output on the order of 0.5 to 2 W using four parallel 0.5 W channels. Despite using four (or more) separate channels, overall circuit complexity is actually decreased. For example, high power (e.g., 0.5 W) monolithic millimeter wave integrated circuits (MMICs), previously used in radar technology, can be used in the transmitter and receiver portions of a transceiver according to exemplary embodiments of the present invention to achieve full duplex, high power wireless communications with a simple circuit design. The high power outputs and fast information transmit/receive rates enable the use of wireless communications for broadband networking technologies and interconnectivity medium standards such as the synchronous digital hierarchy (SDH) known as the synchronous optical network SONET/SDH (e.g., SONET ring architectures having self-healing ring capability). Using available MMICs, such as high quality, low noise MMIC amplifiers, a five decibel (dB) noise figure or lower can be realized in a receiver portion. A transmitter configured using one or more MMICs can be used in conjunction with a receiver of the transceiver to provide point-to-point full duplex operation at operating frequencies in a fixed wireless spectrum range of 18-40 GHz (e.g., on the order of, for example, 20 GHz to 40 GHz) or wider, in contiguous 50 megahertz (MHz) segments (or any other specified operating frequency range), over a range of the order of 2 kilometers (km) with, for example, 40 dB range attenuation or higher. As such, exemplary embodiments are suitable for a variety of applications including, but not limited to, point-to-point wireless communications between computers, such as between personal computers, between computer networks and between mainframe computers over broadband networks with high reliability.

The FIG. 1 transmitter 100 includes means for performing at least one of modulating and demodulating information signals. Because FIG. 1 illustrates a transmitter portion of a transceiver, a modulating means is illustrated which includes a data input means 102, a data processing means 104 and a power output means 106. The transmitter 100 further includes a means for information transmission/reception, the information transmission/reception means including an isolation means for information transmission with a first polarization. The information transmission/reception means is illustrated in FIG. 1 as a radio frequency output 108.

The transmitter 100 can be configured using high power monolithic millimeter wave integrated circuits. Although a plurality of separate integrated circuits are available to implement the various functions of the FIG. 1 embodiment, those skilled in the art will appreciate that all of the functions implemented by monolithic millimeter integrated circuits in FIG. 1 can be configured onto a single substrate to further enhance compactness. Moreover, all components used to implement the FIG. 1 transmitter (i.e., any monolithic millimeter wave integrated circuit components, as well as any remaining components, including any voltage regulator, an antenna, a modem, a local oscillator, and so forth) can be configured on a single substrate to further enhance compactness.

The data input means 102 includes an intermediate frequency input 110 for receiving information (such as data) modulated on an intermediate frequency over an information input channel from, for example, a modem via an intermediate frequency on the order of, for example, 2-3 GHz. The modem can, for example, be configured in accordance with a SONET optical carrier standard like OC-3 or be a Fast Ethernet modem (e.g., 100 Mb/s), or any other modem. A local oscillator (LO) input 112 is provided via a separate input of a local oscillator input channel. The local oscillator input can be on the order of, for example, 18 GHz, and can be received from any available exciter, or can be received from an exciter as configured in accordance with an exemplary embodiment to be described with respect to FIG. 6.

The data can be received via a microstrip line to coaxial connector (e.g., K-connector) 114, which provides a first output of the data input means 102. The gain at each point along the transmission paths of FIG. 1 illustrate the gain for a particular element with an arrow, the cumulative gain being shown above the path. Numbers illustrated vertically on the drawings constitute absolute power levels. Each of the vertical numbers (power levels) is determined by using the gain or loss of the component in between each of the numbers. For example, a −3 dB input power level relative to one milliwatt which occurs at the input to the connection link 114, is reduced by the −1 dBm of the insertion loss (I.L.) of the microstrip line to coaxial connector, to produce a −4 dBm loss at the output of the connection 114. The output from the connection 114 is supplied to a modulator 124 of the data processing means 104. The modulator 124 can, for example, be an upconverter which produces an output with a frequency that is higher than the frequencies of either input to the upconverter, or can be any other type of modulator.

The local oscillator input 112 can be supplied to a microstrip line to coaxial connector 116 via an amplifier which, for example, provides a 10 dB boost to the signal. The output from the connection 116 can be supplied to an amplifier 118 which boosts the signal by, for example, 12 dB. In exemplary embodiments, all amplifiers used in the transceiver can be available high power monolithic millimeter wave integrated circuit amplifiers. The output can be supplied to a frequency multiplier (2 times multiplier) 120, also configured as an available monolithic millimeter wave integrated circuit. The output from the frequency multiplier is supplied to a bandpass filter 122 to provide a second input from the data input means 102 to the modulator 124. In the FIG. 1 embodiment, filters and attentuators are not configured using MMICs. For example, the filters and attentuators, can be configured using conventional thin film, metallic traces. However, those skilled in the art will appreciate that these components can, if desired, be configured in alternate embodiments using MMICs.

The first and second outputs of the data input means 102 are supplied as first and second channel inputs to the modulator 124, which sums the frequency $f_1$ of the first channel input, and $f_2$ of the second channel input. The modulator 124 can be configured using any available MMIC. A difference between $f_1$ and $f_2$ is also produced as an unwanted lower sideband, which is filtered from the transmitter. That is, the modulator 124 of the data processing means 104 supplies an output with, for example, a 7 dB loss to a bandpass filter 126 which bears a 5 dB loss and which removes the difference frequency $f_1$-$f_2$. The output from the bandpass filter 126 is supplied to an amplifier 128 which boosts the signal with a 9 dB gain over the signal path to an attentuator 130. An output from the attenuator 130 is supplied as the output of the data processing means 104, to the input of power output means 106.

The power output means 106 receives the output from attenuator 130 via an amplifier 132, and supplies an output to a first 90° hybrid 134, such as a branchline coupler, for splitting the signal into two channels 136 and 138. In the FIG. 1 embodiment, each 90° hybrid is configured using a conventional thin film, metallic trace. The amplifier 132 provides a 22 dB gain, and supplies the output to the hybrid 134. Outputs from the hybrid 134 are supplied to amplifiers 140 and 142, respectively which impart a 16 dB gain to the signals therein. Outputs from the amplifiers 140 and 142 are supplied to second and third hybrids 144 and 146, respectively. Hybrids 144 and 146 separate the inputs from channels 136 and 138 into four amplification channels 148, 150, 152 and 154, each possessing one of the amplifiers 156, 158, 160 and 162 for imparting a 7 dB gain to the signals therein.

Outputs from each of the four amplifiers in the amplification channels are supplied to fourth and fifth hybrids 164 and 166. The hybrids 164 and 168 recombine the signals from amplification channels 148 and 150 into a first power output channel 168 and a second power output channel 170. Signals in the power output channels 168 and 170 are supplied to a sixth 90° hybrid 172, which, with a 0.3 dB loss, supplies a transmitter output signal with a 34.2 dB power to a transmitter microstrip line to coaxial connector 174. An output from the connector 174 is supplied via a connector to the information transmission means configured as the radio frequency output 108.

The 90° hybrids of the power output means 106 are identically configured, and are elements well known to those skilled in the art. Referring to the first 90° hybrid 134, a load 176 is illustrated. This load is used to prevent reflections from the power amplifiers from influencing operation of the circuit. The hybrids permit the use of four separate, parallel stages, or channels, of amplification. Thus, to provide 2 W output, each of the four channels can be configured with 0.5 W amplifiers, thereby achieving four times the power with the same compression, and achieving good distortion control. The hybrids split power evenly, and minimize signal reflections without substantially increasing circuit complexity. Those skilled in the art will appreciate that although the exemplary FIG. 1 embodiment is illustrated as using the 90° hybrids, other circuit components can be used to achieve similar operation. For example, each of the 90° hybrids is a branchline coupler which can be replaced by other 90° hybrids, such as Lange couplers or air bridges having tightly coupled lines.

The radio frequency output 108 can be configured as a dual polarization (90° rotation of phase) antenna for establishing isolation between transmission and reception. This isolation can be achieved using, for example, two individual antennae separated by a distance, or by using a single antenna and an isolator. The use of polarization enhances the signal-to-noise ratio and therefore enhances the range for a given transmitter power output level and for a given receiver noise figure. Exemplary embodiments can achieve bit-error rates on the order of $10^{-12}$ or lower and can achieve almost 100% availability.

Exemplary embodiments can use an antenna having a flat plate design, with printed dipoles, such as an antenna available from Malibu Research, Inc. The antenna can be configured with multiple planes, wherein one plane has different attenuation than another plane to achieve orthogonality. For example, the antenna can be configured for 700 MHz offsets in transmit frequencies for channels operating in opposite directions, the offsets being generated by the offset of the intermediate frequencies between transmit and receive frequencies at opposite ends of the communication link. In an exemplary embodiment, at one end of the communication link, the intermediate frequency into the transmitter is 2.325 GHz and the receiver output is 3.025 GHz; at another end, the transmitter uses an intermediate frequency of 3.025 GHz and the receiver is 2.325 GHz. This feature permits the transceiver to establish forward and reverse wireless information transfer channels which are isolated from each other.

The exemplary FIG. 1 transmitter can be configured to use phase shift keying for modulation. However, those skilled in the art will appreciate that any modulation techniques known in the art can be employed.

Power supplies for each of the components illustrated in the FIG. 1 transmitter are provided via an on-board transmitter voltage regulator or regulators. In an exemplary embodiment, three such voltage regulators can be included: a first regulator for the data input means 102 and data processing means 104, a second regulator for the portion of the power output means 106 used to establish the four amplification channels 148-154, and a third regulator for recombining the signals from the four power amplification channels into a single RF output. Of course, those skilled in the art will appreciate that a single regulator, or any number of regulators can be used to provide the power supplies to the various components of the circuits.

Figure 2:
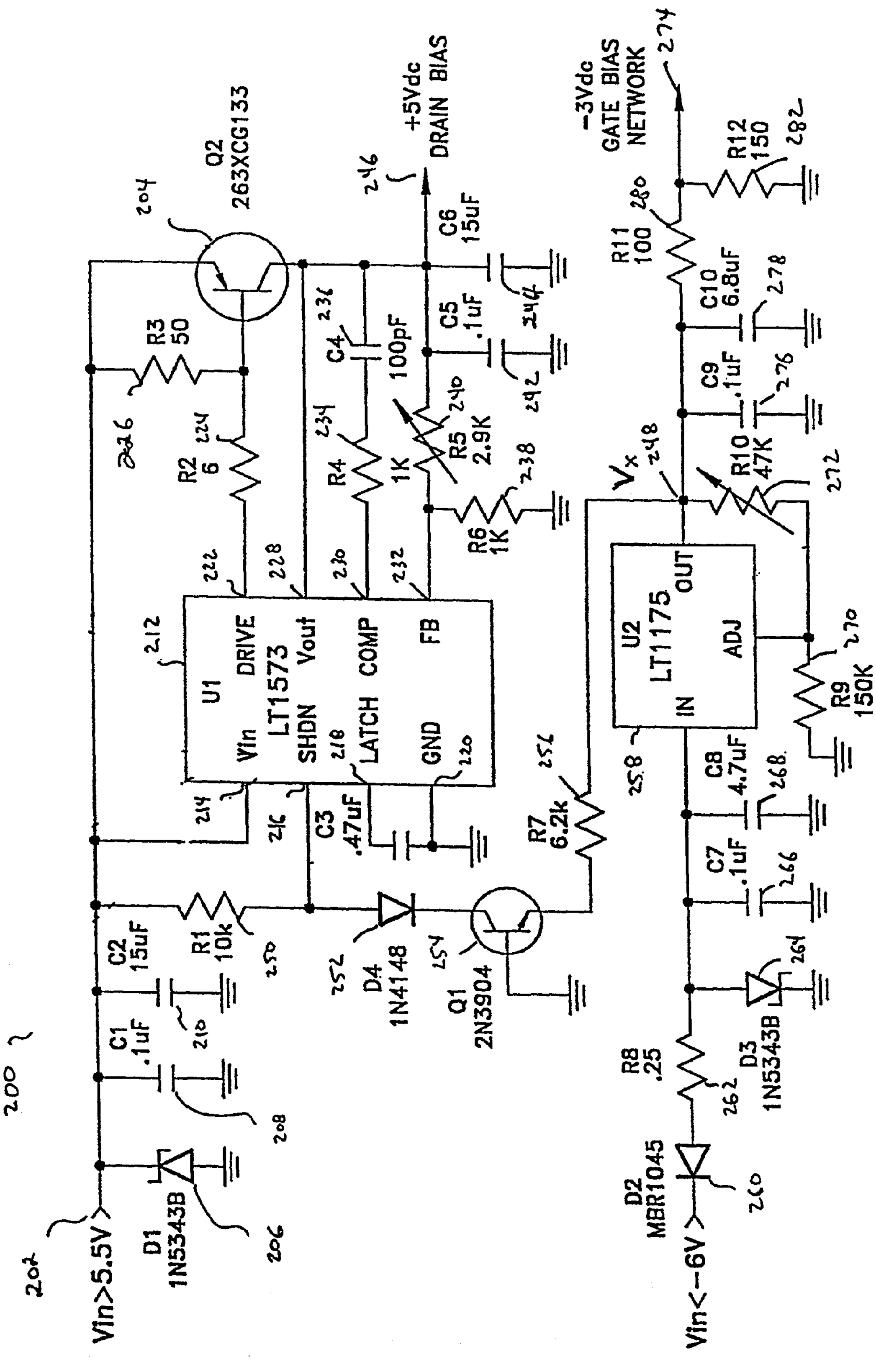
FIG. 2 shows an exemplary block diagram of a transmitter voltage regulator which can be used in conjunction with the FIG. 1 transmitter.

An exemplary voltage regulator which can be used for each of the three voltage regulators described in connection with an exemplary embodiment, is illustrated in FIG. 2. FIG. 2 shows an exemplary embodiment of a transmitter voltage regulator 200. In the exemplary embodiment shown, the regulator is a DC voltage regulator having a 0.3 voltage drop at 7 to 8 amps, with 1-3 W power dissipation. A low voltage drop can be achieved from the input to the output of the regulator through the use of components illustrated, such as the use of a pnp transistor as an output switch. Because the exemplary embodiment illustrated is a monolithic device, it is somewhat sensitive to the effects of high current. Accordingly, exemplary embodiments are configured with a means for protecting the circuit against high currents. For example, in the exemplary embodiments illustrated, if a proper negative voltage is not obtained as a gate bias control voltage, a positive voltage cannot appear at the drain bias output of the circuit.

Referring to FIG. 2, the transmitter regulator 200 receives an input voltage $V_{in}$ on the order of 5.5 volts, or any other desired input voltage. The voltage input, designated 202 is used as the supply for the drain of a voltage switch 204, represented as a pnp transistor Q2, such as a transistor designated 263XCG133, available from Solitron Corporation.

The voltage input 202 is supplied via voltage stabilizing and filter components represented in the exemplary FIG. 2 embodiment as a Zener diode 206, and parallel capacitors 208 and 210. The voltage input 202 is also supplied as the input voltage to a voltage regulator chip 212, such as the chip designated LT1573 available from Linear Technology, Inc. The voltage regulator chip 212 also includes a shutdown input 216, a latch input 218, and a ground connection 220.

Outputs of the voltage regulator chip 212 include a drive output 222 for driving the base of the voltage switch 204 via a voltage divider comprised of resistors 224 and 226. An additional output of the voltage regulator chip is designated as the voltage output, $V_{out}$, which is connected to the collector of the voltage switch 204. The voltage regulator chip 212 includes a comparison output 230. The comparison output 230 is supplied to the collector of the voltage switch 204 via a resistor 232, a resistor 234 and a capacitor 236. The compare output compares a feedback signal from the regulator output with the $V_{out}$ voltage to monitor collector current and to adjust a setpoint. The feedback is received via a feedback input 232 connected to the collector of the voltage switch 204, via resistor 238, adjustable resistor 240, and capacitors 242 and 244. The adjustable resistor permits adjustment of the drain bias voltage output from the regulator. The output from the collector of the voltage switch 204 is, in the exemplary embodiment illustrated, a five volt DC bias 246.

To protect the circuit against high current fluctuations, the transmitter regulator is configured with a protective means, whereby the voltage regulator chip 212 cannot operate unless a voltage $V_x$ at a node 248 is sufficiently negative. The shutdown input 216 of the voltage regulator chip 212 is connected to a node between resistor 250 and diode 252. The diode 252 is connected to the collector of a transistor 254, such as a transistor chip 2N3904 available from Solitron Corp. The base of this transistor is grounded, and the drain is connected via a resistor 256 to the node 248.

The node 248 corresponds to the output of a negative voltage regulator, such as the regulator LT1175 available from Linear Technology, Inc. The negative voltage regulator 258 receives an input voltage on the order of −6 volts, or less, supplied via a reverse biased diode 260, a resistor 262, and a voltage stabilizing filter circuit which includes a Zener diode 264, capacitor 266 and capacitor 268 connected in parallel.

The desired value of $V_x$ at node 248 can be adjusted via a divider network that includes a resistor 270 and an adjustable resistor 272. The voltage $V_x$ is supplied to a second output of the transmitter regulator to provide a gate bias on the order of −3 volts DC, at the output 274. The voltage $V_x$ is supplied to the regulator output 274 via a filter which includes capacitor 276, a capacitor 278, and via a voltage divider network which includes resistors 280 and 282. Exemplary component values for each of the components shown in FIG. 2 are illustrated.

In operation, when the proper voltage is output from the negative voltage regulator 258 to the node 248, a current path can be established from the input 202 to the node 248, such that the shutdown input 216 of the voltage regulator chip 212 remains inactive. However, if the voltage at node 248 rises above a predetermined threshold established by the user such that it becomes at or near zero, or positive, current will not flow from the voltage input 202 to the node 248. Rather, current can flow from the voltage input 202 into the shutdown input 216 of the voltage regulator 212, thereby causing the voltage regulator chip 212 to inhibit a drain bias voltage at the output 246 of the transmitter regulator 200.

In operation, the gate voltage at the output 274 is controlled to be between −1 volt and −3 volts, depending on the adjustments made to adjustable resistor 272, to control current throughout the transmitter. When a proper negative voltage appears at the node 248 (and thus, the output 274), then the voltage regulator 212 will be enabled to provide the 5 volt drain bias at the output 246. Similar transmitter regulators can be included for the other components of the FIG. 1 transmitter as discussed previously.

Figure 3:
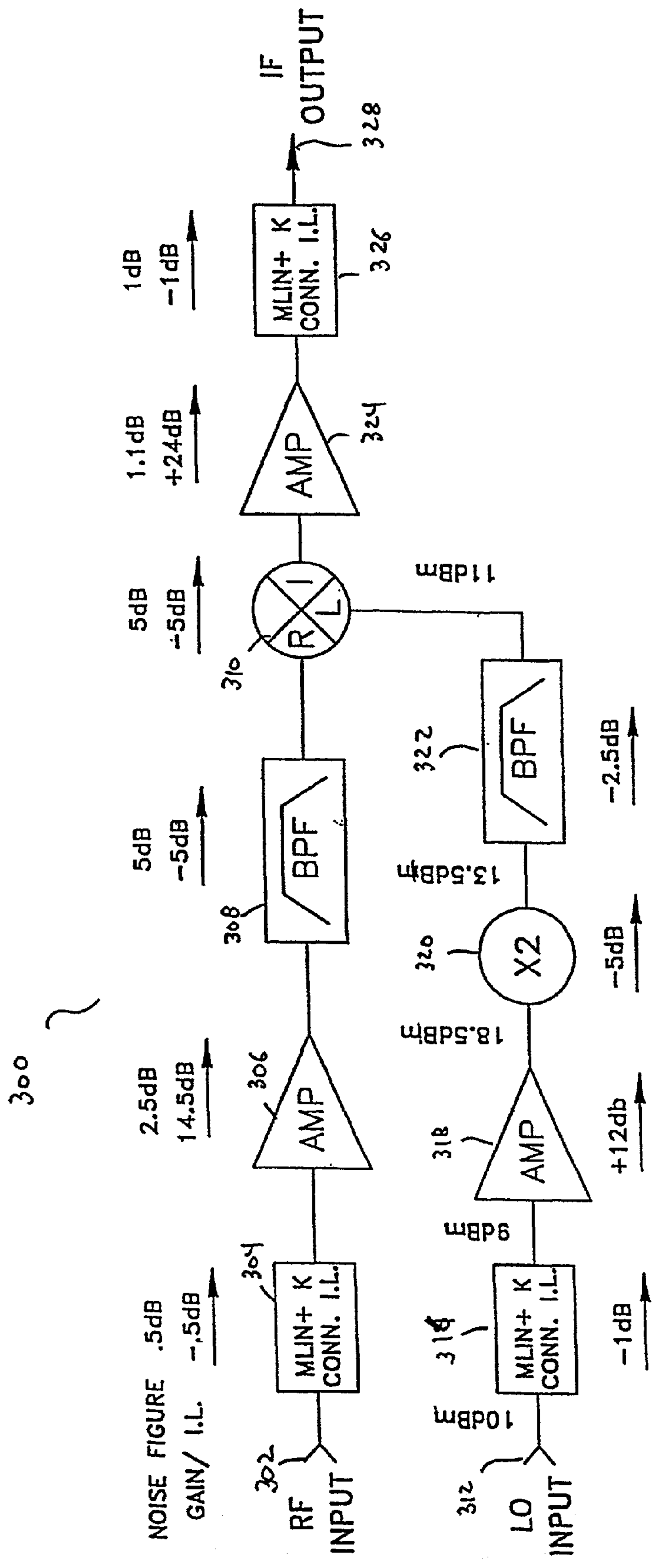
FIG. 3 shows an exemplary embodiment of a receiver block diagram which can be used in conjunction with a transceiver of the present invention.

Having described an exemplary embodiment of a transmitter and transmitter regulator, reference is made to FIG. 3 wherein an exemplary receiver in accordance with the present invention is illustrated. The FIG. 3 receiver 300 constitutes a means for reception of information, and includes means for performing at least one of modulating and demodulating information signals. Because FIG. 3 illustrates a receiver portion of a transceiver, a demodulating means is illustrated which includes a data input means and a data processing means. Like the transmitter, the FIG. 3 receiver is configured using at least one monolithic millimeter wave integrated circuit. For example, as with the transmitter, amplifiers and frequency multipliers can be available monolithic millimeter wave integrated circuits, as can a demodulator. Alternately, all components can be configured using MMICs. In addition, all components of the receiver, (including an antenna, the local oscillator, any voltage regulator and so forth), can be configured on a single substrate.

The data input means includes an information input channel and a local oscillator input channel. The information input channel includes the radio frequency input 302, a microstrip line to coaxial connector 304, an amplifier 306, and a bandpass filter 308. An output of the information input channel is supplied to a demodulator, or converter (i.e., mixer) 310. The demodulator 310 can, for example, be a downconverter which produces an output with a frequency that is lower than the frequencies of either input to the downconverter, or can be any other type of demodulator.

The demodulator 310 also receives the output of the local oscillator input channel. The local oscillator input channel of the FIG. 3 receiver is configured identically to that of the local oscillator input channel illustrated in the FIG. 1 embodiment of a transmitter. More particularly, the local oscillator input channel includes the local oscillator input 312, a microstrip line to coaxial connector 316, an amplifier 318, a frequency multiplier 320 and a bandpass filter 322. The demodulator 310, like that of the FIG. 1 transmitter, produces an output which corresponds to both the sum and the differences of frequencies $f_1$, and $f_2$ associated with the information and local oscillator input channels, with the difference being output from the demodulator and with the sum (e.g., 60 GHz) being filtered. Outputs from the demodulator 310 are supplied via an amplifier 324 and a microstrip line to coaxial connector 326 to produce an intermediate frequency output 328 constituting a demodulated, received signal. As with FIG. 1, noise figures and gain figures at each point along the transmission paths shown are illustrated. The intermediate frequency output 328 can be transmitted to a modem.

A single receiver voltage regulator can be used in connection with the FIG. 3 receiver. A DC voltage regulator for the receiver is illustrated in FIG. 4.

Figure 4:
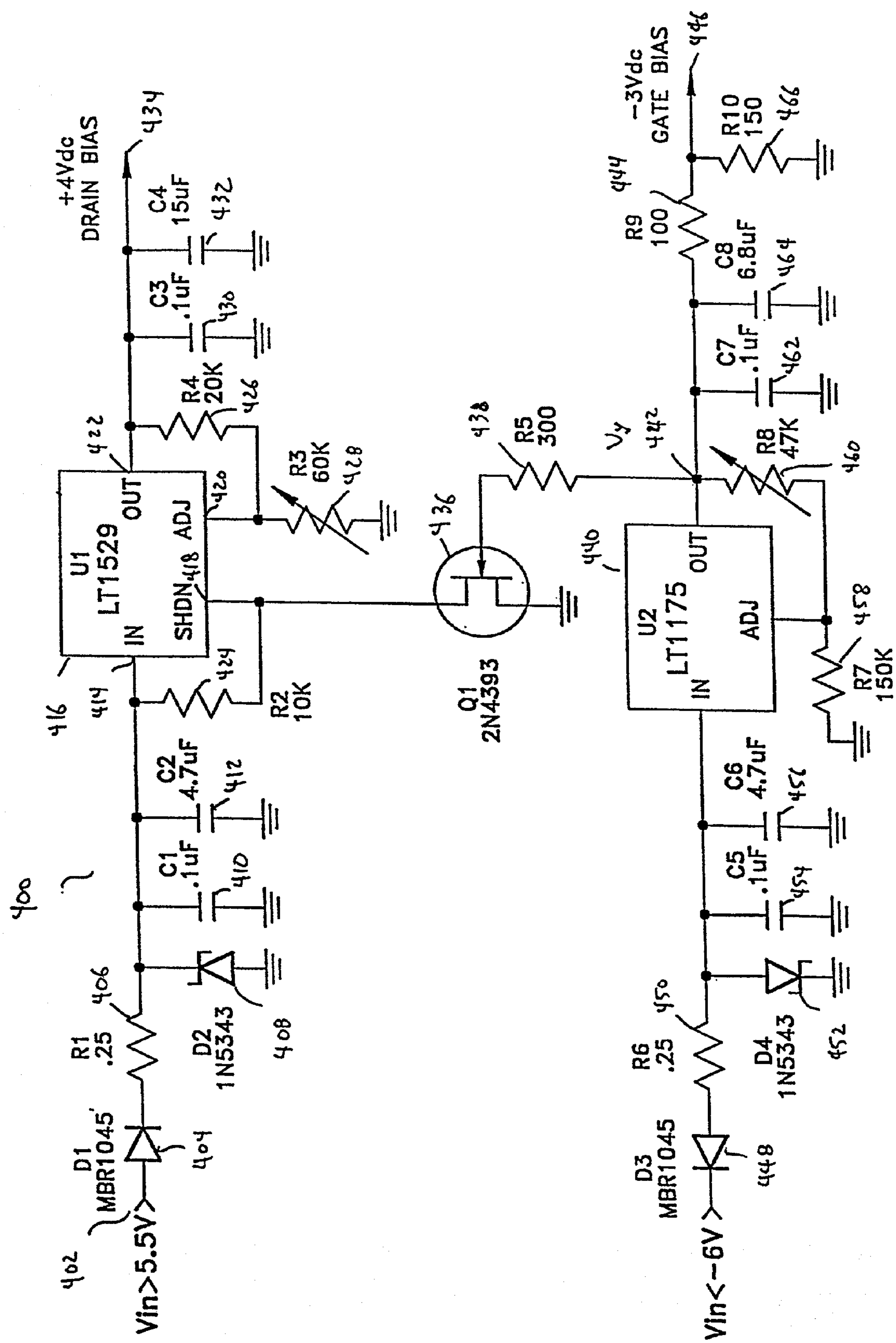
FIG. 4 shows an exemplary embodiment of a receiver voltage regulator which can be used in conjunction with the FIG. 3 receiver.

Referring to FIG. 4, a receiver voltage regulator 400 includes a voltage input 402, on the order of 5.5 volts or greater. This input is supplied via a voltage stabilizing and filter network which includes diode 404, resistor 406, Zener diode 408, capacitor 410 and capacitor 412, to an input 414 of a positive voltage regulator 416. The positive voltage regulator 416 includes a shutdown input 418, an adjustment input 420 and an output 422. A feedback resistor 424 is connected between the input 414 and the shutdown 418. The adjustment input 420 is controlled by a voltage divider that includes a resistor 426 and an adjustable resistor 428. The output of the positive voltage regulator is supplied to a DC drain bias output on the order of 4 volts via filter capacitors 430 and 432.

The shutdown input 418 is controlled by a MOSFET, such as a transistor 436 designated 2N4393 available from Solitron Corp., whose drain is grounded and whose collector is connected to the shutdown input. A gate of the transistor 436 is connected via a resistor 438 to the output of a negative voltage regulator 440 configured similar to that of the negative voltage regulator in FIG. 2 The output of the negative voltage regulator 440, designated $V_y$ at node 442, is supplied via a resistor 444 to a gate bias output 446, on the order of −3 volts.

The negative voltage regulator 440 is driven at its input by an input voltage on the order of −6 volts or less, supplied via a voltage stabilizing and filter network which includes a reverse biased diode 448, a resistor 450, and a parallel combination of a Zener diode 452, a capacitor 454 and a capacitor 456. The negative voltage regulator 440 can be adjusted via a voltage divider that includes a resistor 458 and an adjustable resistor 460. The output of the negative voltage regulator is supplied to the gate bias output 446 via a filter network which includes capacitors 462, 464, and a voltage divider network that includes resistor 444 and resistor 466.

As with the FIG. 2 transmitter regulator, the FIG. 4 receiver regulator only provides the drain bias output when an appropriate voltage $V_y$ is present at the node 442, and an appropriate gate bias is present at output 446. Operation of the FIG. 4 regulator with respect to a shutdown of the positive voltage regulator 416, is similar to the operation described with respect to the FIG. 2 regulator.

Figure 5A:
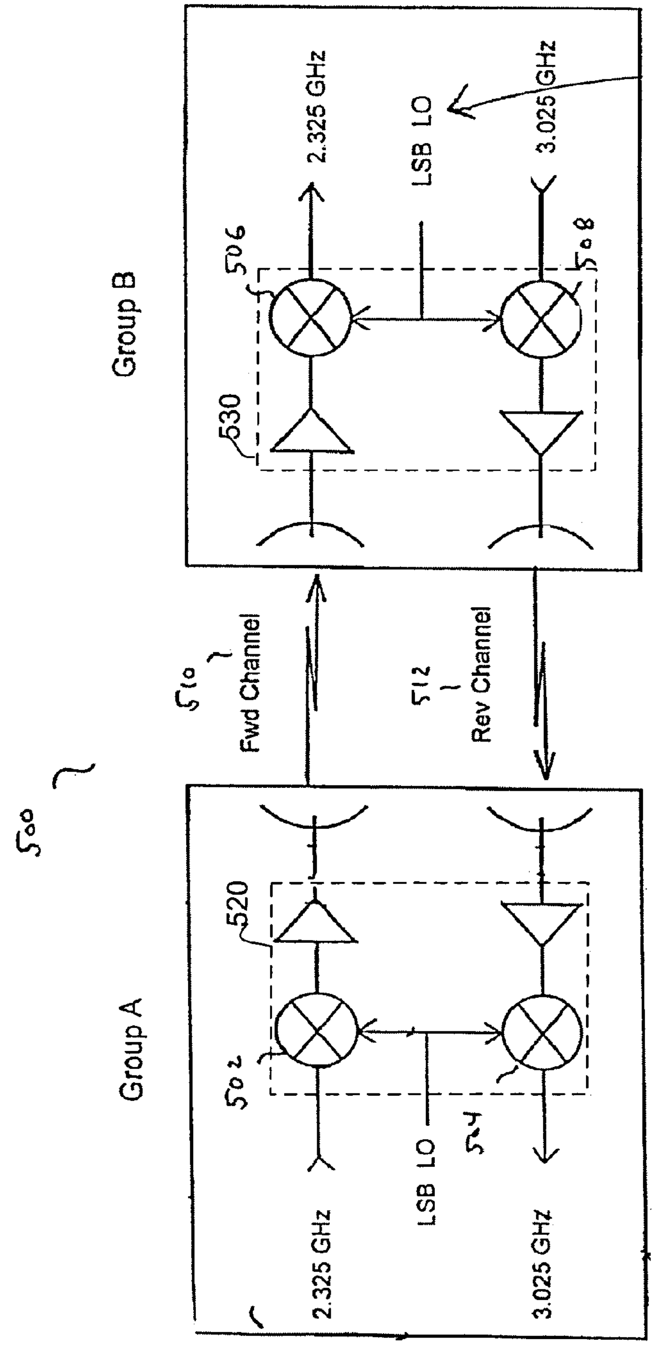
FIGS. 5A and 5B show an exemplary frequency plan which can be used in conjunction with a transceiver of the present invention.
Figure 5B:
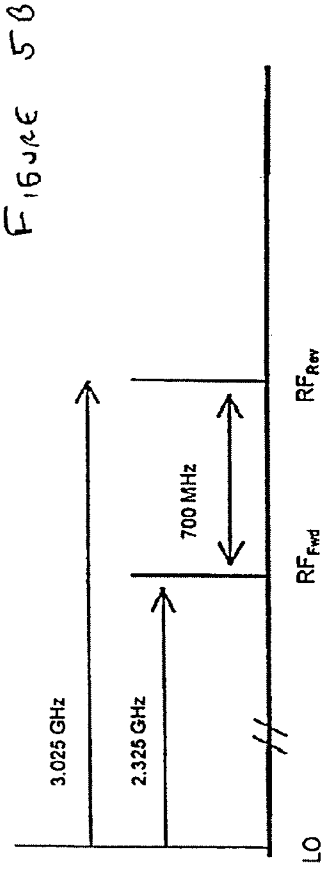

FIGS. 5A and 5B show an exemplary frequency plan for establishing the RF input 110 of the FIG. 1 transmitter. As shown in FIG. 5A, the frequency plan 500 exploits a dual polarization feature used in accordance with the exemplary embodiments of the present invention. More particularly, exemplary embodiments use a dual polarization antenna design to provide transmitter isolation with respect to the receiver and vice versa. Exemplary embodiments can use a single antenna with an isolator, or can use two separate antennae separated by a distance. Also shown in FIG. 5A are dashed boundaries 520 and 530 to conceptually depict an exemplary containment of transceiver components, which containment can be a hermetically sealed housing as variously disclosed.

In the FIG. 5A frequency plan, the transmitter input frequencies include a Group A intermediate frequency on the order of 2.35 GHz, and a Group B intermediate frequency of 3.205 GHz. The receiver intermediate frequencies output therefrom include a Group A frequency of 3.025 GHz, and a Group B frequency of 2.325 GHz, with a 700 MHz separation, as shown in FIG. 5B. As such, information can be transmitted over a forward channel using a first operating frequency, while at the same time, information can be received by the transceiver via a second intermediate frequency associated with a reverse channel.

In the FIG. 5A frequency plan, transmitted Group A frequencies are modulated in a modulator 502 via the local oscillator signal, and are demodulated via a demodulator 504 using, for example, the same local oscillator. Signals are transmitted and received via respective amplifiers and filters.

The Group B frequencies are received via a demodulator 506, and are transmitted with a modulator 508. In accordance with exemplary embodiments of the present invention, both the demodulator and modulator are driven by the same local oscillator although separate local oscillators can, of course, be used. Signals are transmitted and received via the use of filters and amplifiers in the respective transmission and reception paths. As a result, forward and reverse channels 510 and 512, respectively, are established.

The local oscillator can be configured to satisfy the transmitter and receiver specifications set forth herein in any known fashion. In accordance with exemplary embodiments described herein, the exciter receives a reference input frequency of, for example, 50 MHz and a reference input power of 10 dB minimum. The reference input power is provided via a phase locked oscillator coherent with the system reference oscillator. A synthesized output frequency of the exciter is, for example, on the order of 1.2 to 2.525 GHz using 14 channels with 25 MHz spacing, or any other desired frequency and/or spacing.

The local oscillator output can be frequency divided into two channels to provide two outputs, each designated LO/2, having a frequency on the order of 18 GHz (e.g., 18.15 to 18.475 GHz), using 14 channels with 25 MHz spacing. The output power level for the LO/2 output is on the order of 10 to 16 dB, and can be buffered by a saturated amplifier. Exemplary single sideband phase noise for each LO/2 output can, for example, be as follows: −88 dBc/Hz at 100 Hz, −98 dBc/Hz at 100 kHz, −103 dBc/Hz at 10 kHz, −105 dBc/Hz at 100 kHz, and −108 dBc/Hz at 1 MHz. Exciter output port-to-port isolation can be, for example, 20 dB or any other specified isolation. Exciter spurious and harmonic outputs can be on the order of −70 dBc. The exciter output frequency tolerance can be on the order of ±0.6 parts per minute (ppm), and the frequency switching time can be on the order of 1 millisecond. Of course, these values can be varied as desired.

Figure 6:
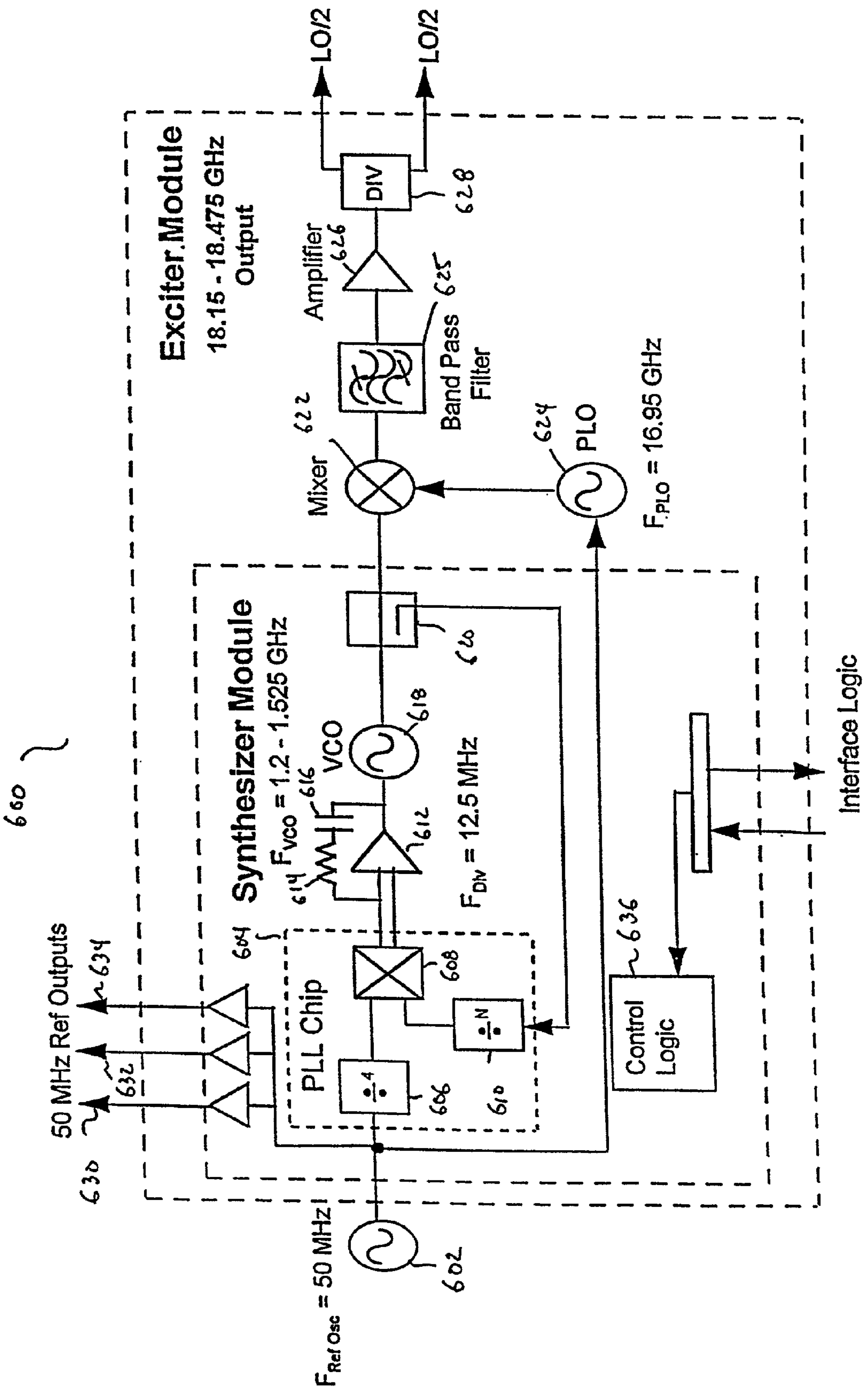
FIG. 6 shows an exemplary embodiment of an exciter which can be used in conjunction with a transceiver of the present invention.

Although any conventional exciter design can be used, FIG. 6 illustrates one exemplary embodiment. The FIG. 6 exciter 600 includes a 50 MHz input from a frequency reference oscillator 602. This reference oscillator frequency is supplied to a phase lock loop chip (PLL chip 604) where it is frequency divided by four via a divider 606, and supplied to a multiplexer 608. The multiplexer 608 receives a feedback signal via an N (e.g., N=4) divider 610. Outputs from the multiplexer 608 are supplied to an integrator configured, for example, as an amplifier 612 with a feedback path that includes a resistor 614 and capacitor 616.

The output from amplifier 612 is used to drive a voltage controlled oscillator 618 to produce a frequency on the order of $F_{VCO}$ of 1.2 to 1.525 GHz. The output from the VCO 618 is supplied via a feedback path 620 to the divider 610. The output from the VCO is also supplied to a mixer 622 which receives a second input from a phase locked oscillator 624 having a frequency on the order of 16.95 GHz. The oscillator 624 is also driven by the frequency reference oscillator 602.

An output from the mixer 622 is supplied via bandpass filter 624 and an amplifier 626 to a divider 628 to provide the exciter outputs designated LO/2, in two separate channels, each channel having an exemplary output frequency on the order of 18.15 to 18.475 GHz. 50 MHz reference outputs 630, 632 and 634 can also be provided from the reference oscillator 602. Control logic 636 can be configured in any conventional fashion to interface with the transmitter and receiver to control overall operation of the exciter.

Having described features of an exemplary circuit configuration for a transmitter and a receiver in accordance with the present invention, those skilled in the art will appreciate that the components can be combined into a single housing constituting a transceiver. Within the transceiver housing, the transmitter and receiver can be separately housed using, for example, hermitic seals for the transmitter and receiver, respectively. Exemplary embodiments employ a carrierless design for mounting the various components of the transmitter and receiver. Alternately, carriers can be employed in the housing.

For example, in a carrierless implementation of the FIG. 1 transmitter, the components shown therein can be considered to be mounted within a hermitically sealed transmitter housing, with each of the components shown being mounted directly to the housing. The housing can, for example, be composed of a first material, and electrical components mounted to the housing can be composed of a second material, a coefficient of thermal expansion of the first material being matched to that of the second material. For example, the housing can be composed of a material that can be easily machined including, but not limited to, silver and nickel/iron material (i.e., silvar), such that the housing is compatible with typical coefficients of thermal expansion, has a high thermal conductivity, and is easy to machine. However, those skilled in the art will appreciate that any materials can be used including, for example, materials such as ceramic aluminum, AlSiC, CuMo, CuW and/or Be/BeO with integrated circuits used to perform the various functions illustrated in FIG. 1 being bonded directly to the housing. A similar configuration can be used with respect to the receiver of FIG. 3, and with respect to the regulators of FIGS. 2 and 4 (the regulators can, of course, be mounted with the hermitically sealed housing of the transmitter or receiver, respectively).

In an alternate embodiment, carriers having matched coefficients of thermal expansion can be mounted in a housing. The housing can have a coefficient of thermal expansion which can be matched to the carriers, although this is not necessary, as an unmatched housing can be used.

Transmission lines used to interconnect the various components shown in FIGS. 1-4 can be configured using, for example, microstrip lines. For example, the transmission lines can be microstrip lines formed on quartz or fused silica. However, those sidled in the art will appreciate that any transmission media used to interconnect the components can be used in accordance with exemplary embodiments described therein.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for full duplex wireless communication of information, comprising:

means for performing at least one of modulating and demodulating information signals, the modulated information signal being boosted in power using a plurality of 90° hybrids arranged in tandem to output a plurality of amplification channels;

means for information transmission/reception, said information transmission/reception means providing for information transmission using a first polarization and for information reception using a second polarization to thereby isolate information transmission from information reception in full duplex communication;

regulator means having at least one DC voltage regulator for providing at least two DC output voltages, wherein one of the at least two DC output voltages is a negative voltage; and means for inhibiting a first of said two DC voltage outputs when the negative voltage of said at least two DC output voltages is above a predetermined threshold.

2. Apparatus according to claim 1, wherein said performing means further includes:

a modulating means having a data input means, a data processing means, and a power output means.

3. Apparatus according to claim 1, wherein said information transmission/reception means includes:

a transmission antenna; and a reception antenna separated by a distance from said transmission antenna.

4. Apparatus according to claim 3, wherein said data input means is configured to receive data modulated on an intermediate frequency of 2-3 GHz.

5. Apparatus according to claim 4, further including:

a local oscillator for modulating said data with a frequency on the order of 18 GHz.

6. Apparatus according to claim 4, wherein said power output means further includes:

plural, parallel amplification channels.

7. Apparatus according to claim 6, wherein said power output means further includes:

at least one coupler for splitting a signal from said data processing means into said plural, parallel amplification channels.

8. Apparatus according to claim 7, wherein said at least one coupler is a 90° hybrid.

9. Apparatus according to claim 7, wherein said power output means further includes:

at least one coupler for combining outputs from said plural, parallel amplification channels into a single output channel.

10. Apparatus according to claim 6, wherein said power output means further includes:

at least three couplers for splitting an output from said data processing means into four separate amplification channels, said output from said data processing means being amplified to produce at least about a 0.5 W output in each of said channels.

11. Apparatus according to claim 6, wherein said power output means further includes:

at least one device for combining outputs from each of said plural, parallel amplification channels into a single output channel.

12. Apparatus according to claim 3, wherein said performing means further includes:

a demodulating means having a data input means and a data processing means.

13. Apparatus according to claim 3, wherein said performing means further includes:

a demodulating means having a data input means and a data processing means.

14. Apparatus according to claim 13, further including:

a local oscillator for supplying a modulating signal to said modulating means, and for providing a demodulating signal to said demodulating means.

15. Apparatus according to claim 13, further including:

hermetically sealed housings for containing components of a transceiver, components of said modulating means and said demodulating means being mounted directly to said hermitically sealed housings.

16. Apparatus according to claim 1, wherein said information transmission/reception means further includes:

a single antenna having a dual polarization capability for transmitting information with a first polarization, and for receiving information with a second polarization.

17. The apparatus according to claim 1, wherein the at least one DC voltage regulator of the regulator means includes a positive voltage regulator and a negative voltage regulator.

18. The apparatus according to claim 17, wherein the positive voltage regulator produces a drain bias voltage and the negative voltage regulator produces a gate bias voltage.

19. The apparatus according to claim 18, wherein the gate bias voltage is the negative voltage.

20. A method for full duplex wireless communication of information in a system haying a modulator and a demodulator, the method comprising the steps of:

performing at least one of modulating and demodulating information signals, the modulated information signal being boosted in power using a plurality of 90° hybrids arranged in tandem to output a plurality of amplification channels;

isolating transmission/reception of information by transmitting information with a first polarization and by receiving information with a second polarization in full duplex communication;

providing a positive regulated DC output voltage and a negative regulated DC output voltage to the modulator and demodulator; and inhibiting an output of said positive regulated DC output voltage when said negative regulated DC output voltage is above a predetermined threshold.

21. A method according to claim 20, wherein said step of isolating transmission/reception of information further includes the steps of:

transmitting information signals via a transmission antenna; and receiving information signals via a reception antenna separated by a distance from said transmission antenna.

22. A method according to claim 21, wherein said step of performing at least one of modulating and demodulating information signals includes:

using an intermediate frequency of 2-3 GHz.

23. A method according to claim 22, wherein said step of performing at least one of modulating and demodulating information signals further includes a step of:

modulating said intermediate frequency using a local oscillator frequency on the order of 18 GHz.

24. A method according to claim 21, wherein said step of performing further includes a step of:

modulating information for transmission as a modulated information signal; and splitting said modulated information signal into plural, parallel amplification channels.

25. A method according to claim 24, wherein said modulated information signal is split into four separate amplification channels, said modulated information signal being amplified in each of said four separate amplification channels to produce at least about a 0.5 W output in each of said channels.

26. A method according to claim 25, further including a step of:

combining outputs from each of said plural, parallel amplification channels into a single output channel.

27. A method according to claim 20, wherein said step of isolating transmission/reception of information, further includes a step of:

transmitting information via a dual polarization antenna using a first polarization, and receiving information with a second polarization via said dual polarization antenna.

28. The method according to claim 20, wherein the positive regulated DC output voltage is a drain bias voltage and the negative regulated DC output voltage is a gate bias voltage.

29. A transceiver for full duplex wireless communication of information, comprising:

at least one of a modulator for modulating information and a demodulator for demodulating information, the modulated information being boosted in power using a plurality of 90° hybrids arranged in tandem to output a plurality of amplification channels;

a dual polarization antenna for transmitting said information with a first polarization, and for receiving information with a second polarization opposite to said first polarization in full duplex communication;

at least one DC voltage regulator producing at least two DC voltage outputs, wherein the at least one DC voltage regulator includes a negative voltage regulator; and a switch for inhibiting a first of said at least two DC output voltages when a second of said at least two DC voltage outputs from the negative voltage regulator is above a predetermined threshold.

30. A transceiver according to claim 29, wherein said dual polarization antenna includes:

a transmission antenna; and a reception antenna separated by a distance from said transmission antenna.

31. A transceiver according to claim 30, wherein said at least one of a modulator and a demodulator further includes:

a local oscillator for modulating an intermediate frequency of 2-3 GHz with a frequency on the order of 18 GHz.

32. A transceiver according to claim 30, wherein said modulator further includes:

plural, parallel amplification channels.

33. A transceiver according to claim 32, further comprising:

at least one coupler for establishing said plural, parallel amplification channels.

34. A transceiver according to claim 33, further comprising:

at least one device for combining outputs of each of said plural, parallel amplification channels into a single output channel.

35. A transceiver according to claim 32, wherein said couplers are 90° hybrids.

36. A transceiver according to claim 32, further comprising:

at least three couplers for establishing said plural, parallel amplification channels, each of said amplification channels producing at least about a 0.5 W output.

37. A transceiver according to claim 29, wherein said dual polarization antenna includes:

a single antenna having a dual polarization capability for transmitting information with a first polarization, and for receiving information with a second polarization.

38. A transceiver according to claim 29, further including:

both said modulator and said demodulator.

39. The transceiver according to claim 29, wherein the at least one DC voltage regulator includes a positive voltage regulator that produces the first of said at least two DC output voltages.

40. The transceiver according to claim 29, wherein the first of said at least two DC output voltages is a drain bias voltage.

41. The transceiver according to claim 29, wherein the second of said at least two DC output voltages is a gate bias voltage.

42. The transceiver according to claim 29, wherein the gate bias voltage is a negative voltage.

* * * * *